United States Patent
Shi et al.

(10) Patent No.: US 7,060,202 B2
(45) Date of Patent: Jun. 13, 2006

(54) PROCESS FOR PREPARING RARE EARTH LUMINESCENT MATERIALS

(75) Inventors: Chunshan Shi, Changchun (CN); Zeren Ye, Changchun (CN); Yingliang Liu, Changchun (CN); Xiaotang Liu, Changchun (CN); Chunyu Zang, Changchun (CN)

(73) Assignee: Changchun Institute of Applied Chemistry Chinese Academy of Science, Changchun (CN)

( * ) Notice: Subject to any disclaimer, the term of this patent is extended or adjusted under 35 U.S.C. 154(b) by 315 days.

(21) Appl. No.: 10/153,731

(22) Filed: May 24, 2002

(65) Prior Publication Data

US 2003/0057400 A1   Mar. 27, 2003

(30) Foreign Application Priority Data

Sep. 27, 2001   (CN) .............................. 01 1 41983

(51) Int. Cl.
  *C09K 11/63*   (2006.01)
  *C09K 11/71*   (2006.01)
  *C09K 11/73*   (2006.01)
  *C09K 11/64*   (2006.01)
(52) U.S. Cl. .................... 252/301.4 P; 252/301.4 H; 252/301.4 R
(58) Field of Classification Search ......... 252/301.4 P, 252/301.4 H
See application file for complete search history.

(56) References Cited

U.S. PATENT DOCUMENTS 6,010,644 A * 1/2000 Fu et al. ............... 252/301.4 R
6,402,987 B1 * 6/2002 Srivastava et al. .... 252/301.4 R
6,596,195 B1 * 7/2003 Srivastava et al. .... 252/301.4 R

OTHER PUBLICATIONS

Liu et al, "New trichromatic phosphor codoped with two rare erath ions in one matrix", Journal of the Chinese Rare Earths Society, vol. 18, No. 2, Jun. 2000, pp. 106-108.*
Translation of "New Trichromatic Phosphor Codoped with Two Rare Earth Ions in One Matrix".*

* cited by examiner

*Primary Examiner*—C. Melissa Koslow
(74) *Attorney, Agent, or Firm*—Venable LLP; Marina V. Schneller

(57) ABSTRACT

The present invention relates to a process for preparing rare earth trichromatic phosphor, comprising the following steps: (1) providing precursors for at least one composition formula selected from the group consisting of $CaBPO_5$:xEu:yTb, $CaAl_rB_{1-r}PO_5$:xEu:yTb and $Ca_2B_5O_9Cl$:xEu:yTb, wherein x=0.02–0.05 (mole ratio), y=0.001–0.01 (mole ratio) and r=0.5–0.8; (2) grinding and mixing the precursors; and (3) calcining the product obtained in step (2) at 800–1000° C. for 3–5 hours. According to the present process, only one matrix material and two rare earth reactive ions ($Eu^{3+}$ and $Tb^{3+}$) are required to synthesize rare earth trichromatic phosphor. That is to say, no reducing reagent is needed; and absence of reducing agent(s) reduces environmental pollution.

4 Claims, No Drawings

PROCESS FOR PREPARING RARE EARTH LUMINESCENT MATERIALS

FIELD OF THE INVENTION

The present invention relates to a process for preparing rare earth trichromatic phosphor.

DESCRIPTION OF THE RELATED ART

In 1974, in the Journal of Electrochemical Society (volume 121, page 1627), J.M.P.J. Verstegen (Phillips Company, Netherlands) reported a process for preparing rare earth trichromatic phosphor. According to this process, three kinds of fluorescent powders, which are $(Y, Eu)_2O_3$ giving red light, $(Tb, Ce)MgAl_{11}O_{19}$ giving green light and $(Ba, Eu)Mg_2Al_{16}O_{27}$ giving blue light respectively, were firstly prepared under different conditions and then mixed together in certain ratio to give the required rare earth trichromatic phosphor.

However, the rare earth ion $Eu^{2+}$ giving blue light can only be obtained from $Eu^{3+}$ by using a special reduce process which is very complicated and requires reducing agent. Unfortunately, up to the present, no other alternative process has been found. Therefore, a new simple, environment-friendly process is desired.

The objective of the present invention is to provide a process for preparing rare earth luminescent materials, which is simple and does not use any reducing agent to thereby avoid environmental pollution.

SUMMARY OF INVENTION

In Chemistry and Physics of Abnormal Valence Rare Earth Elements (Ed. Chunshan SHI and Qiang SU, Scientific Press, Beijing, 1994, in Chinese), Shi (Present inventor) reported that, under certain conditions, electron transfer between a pair of rare earth ions which are electronic configurations conjugate can be achieved, and abnormal valence changes thereof can occur.

According to the above theory, the present invention provides a new process for preparing the rare earth trichromatic phosphor, comprising the following steps:
(1) providing precursors for at least one composition formula selected from the group consisting of $CaBPO_5$:xEu:yTb and $Ca_2B_5O_9Cl$:xEu:yTb, wherein x=0.02–0.05 (mole ratio), y=0.001–0.01 (mole ratio) and r=0.5–0.8; (2) grinding and mixing the precursors; and (3) calcining the product obtained in step (2) at 800–1000° for 3–5 hours. The present invention also provides another process for preparing the rare earth trichromatic phosphor, comprising the following steps: (1) providing precursors for at least one composition formula selected from the group consisting of $CaBPO_5$:xEu:yTb:zCe, $CaAl_rB_{1-r}PO_5$:xEu:yTb:zCe and $Ca_7B_5O_9Cl$:xEu:yTb:zCe, wherein x=0.02–0.05 (mole ratio), y=0.001–0.01 (mole ratio), z=0.001–0.01 (mole ratio), r=0.5–0.8; (2) grinding and mixing the precursors; and (3) calcining the product obtained in step (2) at 800–1000° C. for 3–5 hours.

DETAILED DESCRIPTION OF THE PREFERRED EMBODIMENT

As mentioned above, under certain conditions, electron transfer between a pair of rare earth ions which are electronic configurations conjugate can be achieved, and abnormal valence changes thereof can occur. For example, $Eu^{3+}$ and $Tb^{3+}$ are such a pair of conjugate rare earth ions which, in certain substrate, have the following equilibrium: $Eu^{3+}+Tb^{3+}=Eu^{2+}+Tb^{4+}$. Therefore, in a given substrate, three ions, which are $Eu^{3+}$ giving red light, $Tb^{3+}$ giving green light and $Eu^{2+}$ giving blue light respectively, can coexist and form a trichromatic phosphor, while $Tb^{4+}$ is not luminescent. Further, $Ce^{3+}$ and $Eu^{3+}$ are also a pair of conjugate rare earth ions and the following equilibrium can also exist between them in certain substrate:

$Eu^{3+}+Ce^{3+}=Eu^{2+}+Ce^{4+}$. Therefore, in the above trichromatic phosphor, if $Ce^{3+}$ is further added, then it can not only sensitize $Tb^{3+}$, but also regulate the concentration of $Eu^{3+}$ and $Eu^{2+}$.

According to the present invention, the following three systems doped with rare earth ions europium ($Eu^{3+}$) and terbium ($Tb^{3+}$) can be used to prepare the trichromatic phosphor:

(1) calcium boron phosphate which can be expressed by a chemical formula of $CaBPO_5$:xEu:yTb, and a system which further comprises cerium ion ($Ce^{3+}$) as a sensitizing agent and can be expressed by $CaBPO_5$:xEu:yTb:zCe;

(2) calcium boron aluminum phosphate which can be expressed by a chemical formula of $CaAl_rB_{1-r}PO_5$:xEu:yTb, and a system which further comprises cerium ion ($Ce^{3+}$) as a sensitizing agent and can be expressed by $CaAl_rB_{1-r}PO_5$:xEu:yTb:zCe, wherein r is a mole fraction with r=0.5–0.8; and (3) calcium chloride oxygen boronat which can be expressed by a chemical formula of $Ca_2B_5O_9Cl$:xEu:yTb, and a system which further comprises cerium ion ($Ce^{3+}$) as sensitizing system and can be expressed by $Ca_2B_5O_9Cl$:xEu:Tb:zCe; In all of the above formulas, x, y, z all mean mole fractions, and x=0.02–0.05, y=0.001–0.01, z=0.001–0.01 respectively.

After having been grounded and mixed, the materials are reacted for 3–5 hours both in air and at 800–1000° C. The resulting products were cooled and then a white powder is obtained. Finally, the products in the form of white powder were excitated using ultraviolet light of a wavelength of 365 nm or 254 nm to obtain a trichromatic phosphor in which three wavelengths of 611 or 614 nm, 544 or 545 nm, 402 or 430 nm respectively can coexist.

According to the present invention, only one, but not three, kind of matrix compound is needed to produce the present rare earth trichromatic phosphor; and only two, but not three, kinds of rare earth reactive ions are doped: $Eu^{3+}$ and $Tb^{3+}$. Moreover, the $Eu^{2+}$ giving blue light is obtained through the electron transfer between $Eu^{3+}$ and $Tb^{3+}$, in which, no reducing agent is needed. In addition, it can be synthesized in air. Thus this process is simple, and will not cause any environmental pollution. If $Ce^{3+}$ is used, a better sensitization effect can be obtained.

EXAMPLES

Example 1

The synthesis of $CaBPO_5$:xEu:yTb system $Eu_2O_3$, $Tb_4O_7$, both with purity of 99.99%, $CaCO_3$, $B_2O_3$, $(NH_4)_2HPO_4$, all with analytical purity, were weighed in a stoichiometric way. $Eu^{3+}$ was added with a mole fraction of 0.05, $Tb^{3+}$ with a mole fraction of 0.01. $(NH_4)_2HPO_4$ is in excess of 10%. They were grounded and mixed in agate mortar and put in a Si—C tube furnace, heated at 300° C. for 20 minutes and then heated at 850° C. for 5 hours, cooled to room temperature. The product is a white powder. Its crystalline structure was determined by x-ray diffraction analysis. The powder was excited at 365 nm and 254 nm respectively, the emission peaks for $Eu^{3+}$, $Tb^{3+}$, and $Eu^{2+}$ are at 611 nm, 544 nm and 402 nm respectively. The emission intensity at 365 nm is stronger than that at 254 nm.

Example 2

The synthesis of $CaBPO_5$:xEu:yTb:zCe system $CeO_2$, $Eu_2O_3$, $Tb_4O_7$, all with purity of 99.99%, $CaCO_3$, $B_2O_3$, $(NH_4)_2HPO_4$, all with analytical purity, were weighed in a stoichiometric way. $Eu^{3+}$ was added with a mole fraction of 0.05, $Tb^{3+}$ with a mole fraction of 0.01, $Ce^{3+}$ with a mole fraction of 0.01. $(NH_4)_2HPO_4$ is in excess of 10%. They were grounded and mixed in agate mortar and put in a Si—C tube furnace, heated at 300° C. for 30 minutes and then heated at 900° C. for 4 hours, cooled to room temperature. The product is a white powder. Its crystalline structure was determined by x-ray diffraction analysis. The powder was excited at 365 nm and 254 nm respectively, the emission peaks for $Eu^{3+}$, $Tb^{3+}$, and $Eu^{2+}$ are at 611 nm, 544 nm and 402 nm respectively. In comparison, example 1, the emission intensities of $Tb^{3+}$ and $Eu^{2+}$ are stronger.

Example 3

The synthesis of $CaAl_{0.8}B_{0.2}PO_5$:xEu:yTb system $Eu_2O_3$, $Tb_4O_7$, all with purity of 99.99%, $CaCo_3$, $Al_2O_3$, $B_2O_3$, $(NH_4)_2HPO_4$, all with analytical purity, were weighed in a stoichiometric way. $E^{3+}$ was added with a mole fraction of 0.02, $Tb^{3+}$ with a mole fraction of 0.005. $(NH_4)_2HPO_4$ is in excess of 10%. They were grounded and mixed in agate mortar and put in a Si—C tube furnace, heated at 360° C. for 20 minutes and then heated at 950° C. for 5 hours, cooled to room temperature. The product is a white powder. Its crystalline structure was determined by x-ray diffraction analysis. The powder was excited at 365 nm and 254 nm, the emission peaks for $Eu^{3+}$, $Tb^{3+}$, and $Eu^{2+}$ are at 611 nm, 544 nm and 430 nm respectively. The emission intensity at 365 nm is stronger.

Example 4

The synthesis of $CaAl_{0.8}B_{0.2}PO_5$:xEu:yTb:zCe system $CeO_2$, $Eu_2O_3$, $Tb_4O_7$, all with purity of 99.99%, $CaCO_3$, $Al_2O_3$, $B_2O_3$, $(NH_4)_2HPO_4$, all with analytical purity, were weighed in a stoichiometric way. $Eu^{3+}$ was added with a mole fraction of 0.02, $Tb^{3+}$ with a mole fraction of 0.005, $Ce^{3+}$ with a mole fraction of 0.001. $(NH_4)_2HPO_4$ is in excess of 10%. They were grounded and mixed in agate mortar and put in a Si—C tube furnace, heated at 360° C. for 20 minutes and then heated at 950° C. for 5 hours, cooled to room temperature. The product is a white powder. Its crystalline structure was determined by x-ray diffraction analysis. The powder was excited at 365 nm and 254 nm, the emission peaks for $Eu^{3+}$, $Tb^{3+}$, and $Eu^{2+}$ are at 611 nm, 544 nm and 430 nm respectively. Compared to example 3, the emission intensities of $Tb^{3+}$ and $Eu^{2+}$ are stronger.

Example 5

The synthesis of $Ca_2B_5O_9Cl$:xEu:yTb system $Eu_2O_3$, $Tb_4O_7$, all with purity of 99.99%, $CaCO_3$, $H_3BO_3$, $CaCl_2 \cdot 2H_2O$, all with analytical purity, were weighed in a stoichiometric way. $Eu^{3+}$ was added with a mole fraction of 0.04, $Tb^{3+}$ with a mole fraction of 0.01. They were grounded and mixed in agate mortar and put in a Si—C tube furnace, heated at 300° C. for 20 minutes and then heated at 850° C. for 3 hours, cooled to room temperature. The product is a white powder. Its crystalline structure was determined by x-ray diffraction analysis. The powder was excited 365 nm and 254 nm, the emission peaks for $Eu^{3+}$, $Tb^{3+}$, and $Eu^{2-}$ are at 614 nm, 545 nm and 430 nm respectively. The emission intensity at 365 nm is stronger.

Example 6

The synthesis of $Ca_2B_5O_9Cl$:xEu:yTl:zCe system $CeO_2$, $Eu_2O_3$, $Tb_4O_7$, all with purity of 99.99%, $CaCo_3$, $H_3BO_3$, $CaCl_2 \cdot 2H_2O$, all with analytical purity, were weighed in a stoichiometric way. $Eu^{3+}$ was added with a mole fraction of 0.04, $Tb^{3+}$ with a mole fraction of 0.01, $Ce^{3+}$ with a mole fraction of 0.005. They were mixed in agate mortar and put in a Si—C tube furnace, heated at 300° C. for 20 minutes and then heated at 850° C. for 3 hours, cooled to room temperature. The product is a white powder. Its crystalline structure was determined by x-ray diffraction analysis. The powder was excited at 365 nm and 254 nm, the emission peaks for $Eu^{3+}$, $Tb^{3+}$, and $Eu^{2+}$ are at 614 nm, 545 nm and 430 nm respectively. Compared to example 5, the emission intensities of $Tb^{3+}$ and $Eu^{2+}$ are stronger.

What is claimed is:

1. A process for preparing rare earth luminescent materials, comprising the following steps:
   (1) providing precursors for at least one composition formula selected from the group consisting of $CaBPO_5$:xEu:yTb, $CaAl_rB_{1-r}PO_5$:xEu:yTb and $Ca_2B_5O_9Cl$:xEu:yTb, wherein x=0.02–0.05 (mole ratio), y=0.001–0.01 (mole ratio) and r=0.5–0.8;
   (2) grinding and mixing the precursors; and
   (3) calcining the product obtained in step (2) at 800–1000° for 3–5 hours.

2. A process as claimed in claim 1, wherein step (3) is carried out in air.

3. A process as claimed in claim 1, wherein the step (3) further comprises a step of pre-heating at 300–360° C. for 20–30 minutes before calcining.

4. A process for preparing rare earth luminescent materials, comprising the following steps:
   (1) providing precursors for at least one composition formula selected from the group consisting of $CaBPO_5$:xEu:yTb:zCe, $CaAl_rB_{1-r}PO_5$:xEu:yTb:zCe and $Ca_2B_5O_9Cl$:xEu:yTb:zCe, wherein x=0.02–0.05 (mole ratio), y=0.001–0.01 (mole ratio), and z=0.001–0.01 (mole ratio), r=0.5–0.8;
   (2) grinding and mixing the precursors; and
   (3) calcining the product obtained in step (2) at 800–1000° for 3–5 hours.

* * * * *